United States Patent
Kapin et al.

[11] Patent Number: 5,873,545
[45] Date of Patent: Feb. 23, 1999

[54] COMBINED FLYING MACHINE

[75] Inventors: Viktor Mikhailovich Kapin; Valery Andreevich Ivchin; Nikolai Serafimovich Pavlenko; Eygeny Lyovich Pogrebinsky; Viktor Vladimirovich Subbotin; Oleg Nikolaevich Maiorov, all of Moscow, Russian Federation

[73] Assignee: Tovarischestvo S Ogranichennoi Otvetstvennostju Kompania "Inalet", Moscow, Russian Federation

[21] Appl. No.: 432,148

[22] PCT Filed: Sep. 2, 1994

[86] PCT No.: PCT/RU94/00207

§ 371 Date: Aug. 17, 1995

§ 102(e) Date: Aug. 17, 1995

[87] PCT Pub. No.: WO95/07215

PCT Pub. Date: Mar. 16, 1995

[30] Foreign Application Priority Data

Sep. 7, 1993 [RU] Russian Federation ............. 93043825

[51] Int. Cl.$^6$ ........................... B64C 29/02; B64C 25/58; B64C 27/20

[52] U.S. Cl. ..................... 244/12.3; 244/12.2; 244/23 C; 244/100 A; 244/107

[58] Field of Search ................................. 244/7 R, 12.2, 244/12.3, 12.6, 23 C, 23 B, 34 A, 67, 107, 100 A

[56] References Cited

U.S. PATENT DOCUMENTS

| | | | |
|---|---|---|---|
| Re. 29,023 | 11/1976 | Malvestuto | 244/6 |
| 2,988,301 | 6/1961 | Fletcher | 244/12 |
| 3,002,709 | 10/1961 | Cochran | 244/12.2 |
| 3,049,320 | 8/1962 | Fletcher | 244/7 R |
| 3,689,011 | 9/1972 | Torelli | 244/12 C |
| 3,938,761 | 2/1976 | Hempenstall | 244/13 |
| 4,196,877 | 4/1980 | Mutrux | 244/12.2 |
| 4,298,175 | 11/1981 | Earl | 244/13 |
| 4,757,962 | 7/1988 | Grant | 244/23 B |
| 4,828,058 | 5/1989 | Bjorn-Ake | 244/100 A |
| 5,035,377 | 7/1991 | Buchelt | 244/23 C |
| 5,152,478 | 10/1992 | Cycon | 244/12.2 |
| 5,277,380 | 1/1994 | Cycon et al. | 244/12.2 |

FOREIGN PATENT DOCUMENTS

| | | |
|---|---|---|
| 1246422 | 2/1968 | Germany . |
| 1550790 | 11/1987 | U.S.S.R. . |
| 1331655 | 9/1972 | United Kingdom . |
| 1405737 | 10/1975 | United Kingdom . |

*Primary Examiner*—V. Lissi Mojica
*Attorney, Agent, or Firm*—Ladas & Parry

[57] ABSTRACT

A combined flying machine comprises a fuselage (1) in the form of a central thick wing with a vertical open tunnel (2), in which there is mounted a lifting rotor (4). Said machine is also provided with outboard wings and a tail unit (8). The machine is equipped with a landing device on an air cushion (19) that surrounds an outlet from the tunnel. A power plant of said flying machine comprises two engine modules (13), disposed from two sides of the tunnel (2) and connected with the lifting rotor (4) and the propulsion propellers (12). The area of the tunnel cross-section in the plane of the lifting rotor rotation amounts to 0.3 to 0.8 of the area of the landing device air cushion, which ensures a safe landing of the flying machine on an unprepared landing site even with a failure of one of the engine modules.

6 Claims, 3 Drawing Sheets

COMBINED FLYING MACHINE

FIELD OF THE INVENTION

The present invention relates to aircraft production and can be utilized in flying machines with vertical take-off and landing of various assignments: passenger-carrying, cargo, cargo-passenger, ambulance and other special purpose aircraft.

PRIOR ART

Flying machines with vertical take-off and landing having promising possibilities in the development of aviation material, as they can be employed on unprepared landing grounds. Such machines are especially appealing for special-purpose aviation and local-service air routes. There are several types of flying machines with vertical take-off and landing.

There are known flying machines with vertical take-off and landing, in which the lift force during the take-off and landing is induced thanks to the reactive force of a high-velocity jet. For instance, the flying machine, set forth in the BRD patent No. 1246422, Cl. B 60 V 3108, (QPC: 62b–60) of 1967, comprises a cylindrical fuselage with wings and a tail unit, power plants for level flight, disposed under the wing, and power plants for take-off and landing. Said power plants for take-off and landing are arranged in pods of the middle part of the fuselage. A drawback of this type of the arrangement is a high fuel consumption under the take-off and landing conditions and a complicated design of said machine, since it is necessary to have additional engines in the power plants for vertical take-off and landing. Furthermore, said high-velocity jet during take-off and landing has a profound impact on the surface of the landing ground, which makes the operation of the machines of this type impossible from soil sites.

In the prior art there is known a flying machine with vertical take-off and landing that constitutes a combination of an airplane and a-helicopter, described in the U.S. Pat. No. Re 29023, Cl. 244-6 of 1976. Said flying machine is provided with a fuselage having a high-mounted wing and vertical fins at the wing tips. The wing is manufactured with a semicircular cut-out of the trailing edge. Over the stern part of the fuselage there is mounted a lifting rotor, the plane of rotation of which coincides with the horizontal plane of the wing. The flying machine is equipped also with power plants for the level flight.

The presence of an open lifting rotor essentially impairs the aerodynamics of said machine in the level cruising flight. Furthermore, the overall dimensions of said lifting rotor and its transmission system are such that said lifting rotor will always be over the fuselage or any other supporting structure, which adversely affects the characteristics of the flying machine at the take-off and landing due to the transverse flow over the fuselage.

There are known in the prior art combined flying machines In which lift during take-off and landing and thrust effort in the level flight are developed by a single device constitutes to a tilt propeller. Such a flying machine is described in the Great Britain patent No. 1405737, Cl. B 7 W of 1975. Said prior art flying machine comprises a fuselage with wings and a tail unit. Said wings supported for supported for tilting, and power plants along with propellers are mounted on the tiltable part of the wings. The same propellers are employed for developing a lift force for take-off and landing as well as for generating a thrust for the level flight. The arrangement with said tilting wing displays advantages in comparison with the open lifting motor, worked up by a lot of designers and embodied in real machines. The use of one and the same propeller for vertical take-off and landing and for level flight, however, imposes very strict requirements to said propeller. The tilting propeller may not feature the same diameter as the lifting rotor of the helicopter, and therefore the specific load on said propeller during the take-off and landing is greater than that of the helicopter. As a consequence, a greater power of the engine is needed. A greater specific load on the propeller during the take-off brings about greater velocities of the air flow under said propeller and a profound erosive effect of the Jet on the soil. Although this effect is smaller than that of the machine with vertical take-off and landing, which utilizes a reactive jet, as set forth in the BRD patent No. 1246422, Cl 60 V 3/08, it is still very high for the majority of soil sites. The machine generates a strong acoustic field. Besides, the presence of said tilting wing with a propeller group makes the design of the machine more complicated and reduces its reliability in general. A transition of the machine from the take-off conditions into those of the level flight and back is very complicated for the control system. Any accidental failure in the control system and in the mechanism of the outer wing panel tilting may result in a grave damage.

Known are combined flying machines with vertical take-off and landing in which the lifting rotor is arranged inside the fuselage of the machine. In said flying machine, protected by the USSR Inventor's Certificate No. 1550790, Cl. B 64 3 1/00 of 1987, the fuselage is in the shape of a symmetrically cambered disk (torus),to which are connected wings, a tail unit and a cabin. In the center of the disk there is a vertical tunnel that houses a central body and a lifting rotor. The inlet and outlet sections of said tunnel are closed with turnable shutters, which are closed under the conditions of the level flight, forming a smooth upper surface of said disk. Under the take-off conditions the turnable shutters on the upper surface of the disk turn vertically, opening an air access into the vertical tunnel. An inlet air intake opening of said vertical tunnel is formed by channels between turnable shutters. An annular volume of said disk is filled up with a light gas, which creates an aerostatic lift force. The machine is provided with propulsion propellers on the wings for the conditions of the level flight and with a landing gear on air cushions. The availability of volumes, filled up with an light gas, makes it possible to reduce the lift force of the propeller and thereby to reduce the power of the engine. Calculations have shown that the aerostatic lift force has an essential effect on the value of the required lift force of the rotor in the tunnel only in case the overall dimensions and load-lifting capacity of the machine are substantial (with the diameter of the disk exceeding 50 m). For flying machines having a take-off weight less than 50 t a gain in the lift force of the propeller turns to be insignificant. Said machine is provided with turnable shutters on the upper surface of the disk, which are opened under the conditions of take-off and landing. These shutters display a great aerodynamic drag in the incoming air flow, which is especially noticable under the transfer conditions, since even with minor opening of said shutters the aerodynamic drag of the flying machine sharply rises. During a transition from the level flight to landing the flying machine may lose its stability before the lifting rotor has an opportunity to start spinning. Said machine features low aerodynamic characteristics, because under the acceleration conditions the disk remains horizontal and does not develope a lift force, the whole of the lift force is built up by the wings. When taking into consideration the overall dimensions of the disk (the diameter in axcess of 50 m), one comes to a conclusion, that the greater part of the surface of the flying machine does not take part in developing the aerodynamic lift force.

The closest to the applied invention in its technical essence is a flying machine according to the Great Britain patent No. 1331655, 01. B 7 W of 1973. Said flying machine comprises a fuselage, manufactured in the shape of a thick lifting wing having a form of a disk with a flattened bottom surface and an asymmetical cross-section. The fuselage is furnished with a cambered tunnel with inlet and outlet openings in which there is a horizontally mounted lifting rotor. The bottom surface of the fuselage mounts a landing device on an air cushions which surrounds the outlet from the tunnel. Said machine is provided with outboard wrings and a twin-fin tail unit. For level flight the flying machine is equipped with propulsion propellers and a jet nozzle. The lifting rotor and the propulsion propellers are driven in rotation from a common power plant. Said flying machine is equipped with an open air intake that faces the incoming air flow and is disposed on the upper surface of the central wing, supplying air into said tunnel. The air intakes of the power plant are arranged behind the air intake of said tunnel and are shadowed by said air intake.

A drawback of said flying machine is an increased aerodynamic drag in the level flight, which is caused by the presence of a permanently operating air intake of the tunnel. In the process, said increased aerodynamic drag is connected not only with the projection of the air intake into the incoming air flow, but also with a drop of the air, bled from the upper surface, practically perpendicular to the bottom surface of the fuselage, which also creates an additional resistance to the incoming flow. As in all other flying machines with vertical take-off and landing of this type it does not link the characteristics of the lifting rotor and the landing device on the air cushion, which turns them into a simple aggregate of the prior art devices.

SUMMARY OF THE INVENTION

The purpose of the present invention is to provide a combined flying machine, in which a propeller and a landing device feature an optimal coordination, A further purpose of the invention is an improvement of the aerodynamic characteristics of the flying machine in the level flight. A still another purpose of the invention is an improvement of the airflow around the flying machine fuselage by the incoming airflow. An additional purpose of the invention is an increase in the operation reliability of the combined flying machine, with reduced power of the power plant during landing.

To attain the enumerated above purposes, the combined flying machine, comprising a fuselage, manufactured in the shape of a thick central wing with an asymmetrical cross-sectional profile having a vertical tunnel that houses a lifting rotor, and outboard wings and a tail unit, propulsion propellers for the level flight, a power plant for driving propulsion and lifting propellers and a landing device on an air cushion, surrounding an outlet from said tunnel. According to the invention, a system of changing the common and cyclic pitch of the lifting rotor, is provided, and the inlet opening of said tunnel is formed by a toroidal surface, which merges with the upper surface of the central wing, the cross-sectional area of the vertical tunnel in the plane of the lifting rotor rotation being 0.3 to 0.8 of the area of the landing device air cushion.

This being the case, the power plant is-made up of two engine modules, arranged in the central wing at two sides of the vertical tunnel, and has two propulsion propellers, the lifting rotor being connected to both engine modules, while each of the propulsion propellers is connected to its own engine module.

Furthermore, the propulsion propellers for the level flight are mounted above and aft of the upper surface of a stern part of the central wing beyond (aft at the the maximum thickness of the central wing).

In this case the propulsion propellers are mounted on pylons, disposed at opposite sides of the tunnel.

Additionally the flying machine is provided with two longitudinal beams, extending above the upper surface of the stern part of the central wing and disposed at opposite sides of the tunnel, with the tail unit being constituted as two fins, fastened on the longitudinal beams, and a horizontal stabilizer connected to said fins, the propulsion propellers being arranged in front of the fins.

The essence of the invention involves the inclusion of the vertical tunnel with the lifting rotor into the aerodynamic arrangement of the combined flying machine under the level flight conditions and, in the process, the provision for correlation between the characteristics of the air cushion and the lifting rotor, which will improve the safety of flight and the aerodynamic characteristics of the machine, and specifically will raise its aerodynamic efficiency. The manufacture of the flying machine fuselage in the shape of a thick central wing with an asymmetrical cross-sectional profile, having a vertical tunnel with open inlet and outlet openings, in which said inlet opening is formed by a toroidal surface, smoothly merging with the upper surface of the central wing, ensuring a flow-over of the central wing in the tunnel zone as of two sequentially mounted aerodynamic profiles, similarly to a flat annular wing. In this case the incorporation in tunnel at the lifting rotor constitutes no obstacle to setting up the flow-over conditions, as in the annular wing, which ensures positive aerodynamic characteristics of the flying machine. The reduction of turbulence is the tunnel by the lifting rotor is assisted by the selection of the tunnel cross-sectional area in the plane of the lifting rotor rotation at a level of 0.3 to 0.8 of the area of the landing device air cushion, whereas the availability of the system for changing the common and cyclic pitch of the lifting rotor with the ratio of areas selected, provides for a reliable transition from one regime to another during the flight. At take-off when operating in the regime of the air cushion, the lifting rotor features the minimum pitch and the minimum loading on the swept area. An increase in the altitude of flight during take-off is achieved by a change in the common pitch of the lifting rotor during the transition of the flying machine from the regime of the air cushion into the hover regime over the ground with the control of the flying machine attitude by means of the system for changing the common and individual pitch of the lifting rotor. In the process the rpm of the power plant is not practically changed, and the power plant operates the rated speed with a high efficiency. At the area ratios selected, the air cushion provides also for damping accidental variations in pressure within the tunnel behind the propeller, which increases the stability of the lifting propeller operation and the operation of the flying machine in general.

The disposition of the propulsion propellers above the upper surface of the stern part of the central wing beyond the line of the maximum thickness values of the aerodynamic profile favours the flow around the fuselage in the regime of the annular wing, since the propellers intensify the airflow of the upper surface of the stern part of the wing. Moreover, in case the propulsion propellers are disposed with a displacement from two sides relative to the tunnel, the propulsion propellers and the lifting rotor have a minimum effect on each other.

The implementing of the power plant in the form of two engine modules, arranged in the fuselage from two sides relative to the tunnel, makes its longitudinal balancing simpler, since the engines are positioned closer to the lift application point of the rotor in the tunnel, and are mounted symmetrically about the longitudinal axis of the machine. The connection of two engine modules to the lifting rotor and by one to each of the propulsion propellers increases the reliability of the flying machine, as a failure of one of the engines does not result in the loss of all the power available. As applied to the present invention, an advantage resides in the fact that with the selected relation of the areas of the tunnel in the plane of the rotor rotation and of the air cushion of the landing device, one engine module is sufficient to land said flying machine, since the transition from the level flight to hovering over the landing site is possible in the hover regime over the ground, that is, at a sufficient altitude to have time for the selection of a site for landing and for moving towards it in the flight regime over the ground or on the air cushion, for which purpose the power of one engine module is adequate.

The longitudinal beams, which project above the upper surface of the stern part, improve its aerodynamics by reducing overflow along the lateral edge of the central wing. In the process, the fins and the horizontal stabilizer are taken out of its aerodynamic effect. The disposition of the propulsion engines in front of the fins improve the controllability of the flying machine at low speeds of flight.

DETAILED DESCRIPTION OF PREFERRED EMBODIMENT OF THE INVENTION

Figure 1:
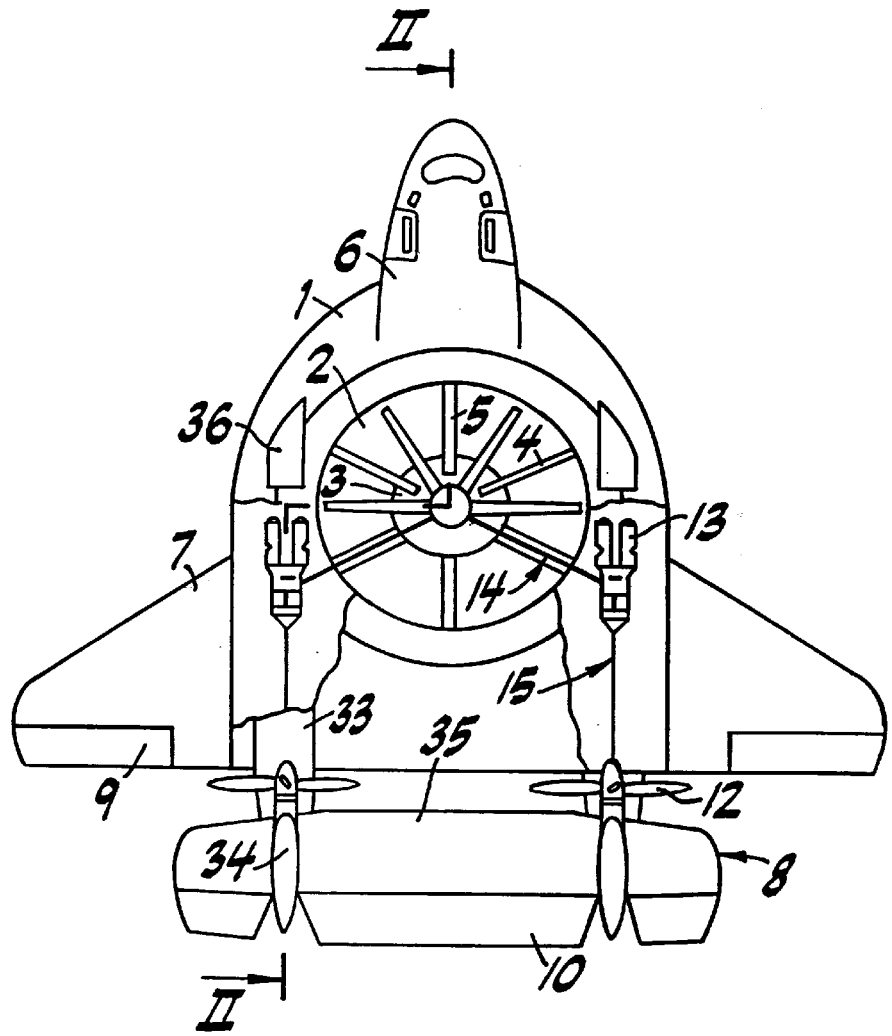
FIG. 1. General arrangement of the flying machine—top view with the skin of the fuselage upper surface partially removed.
Figure 2:
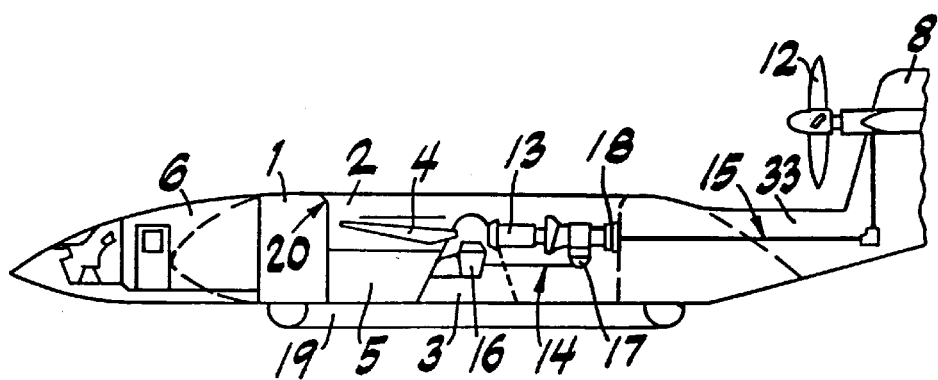
FIG. 2. Longitudinal cross-section of the flying machine along line 11—11 in FIG. 1.
Figure 3:
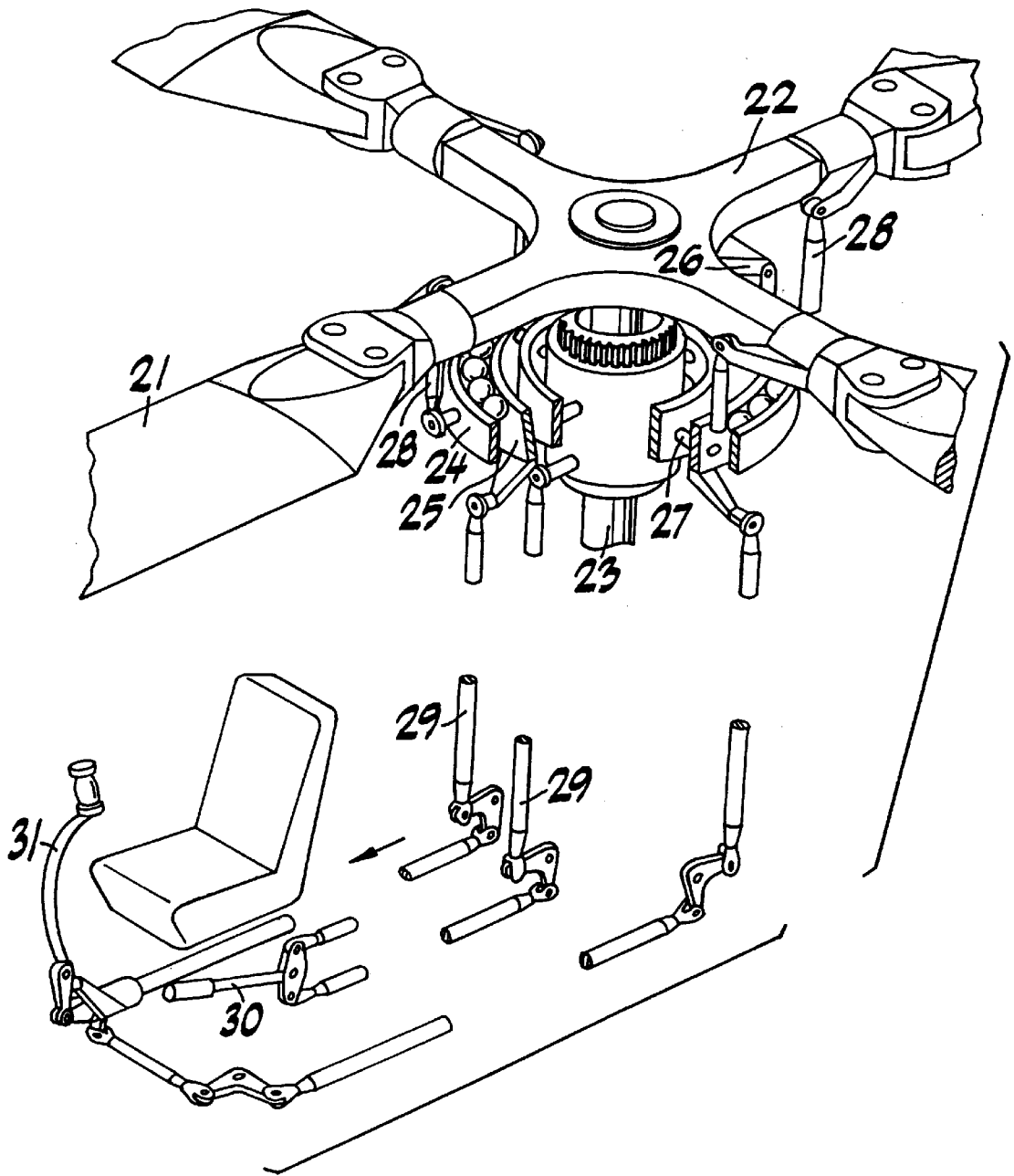
FIGS. 3 and 4 system for changing the common and cycle step of the lifting rotor. In perspective sectional elevation views.
Figure 4:
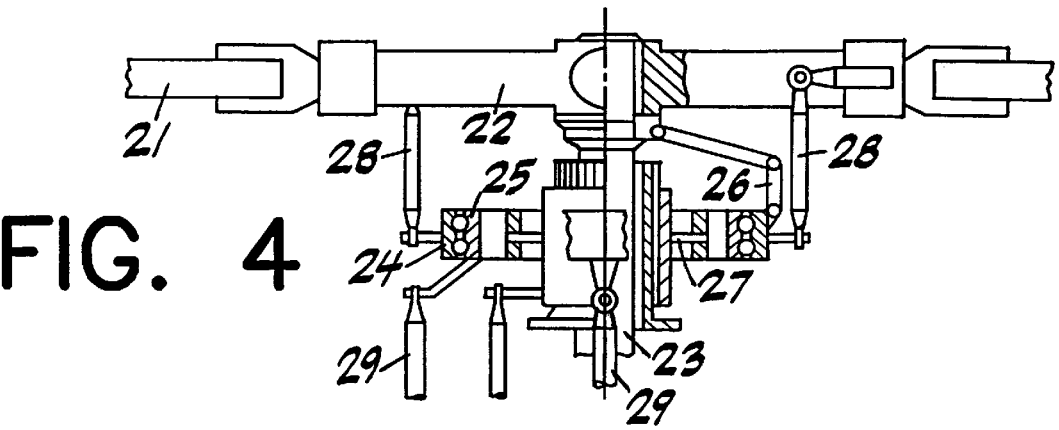
Figure 5:
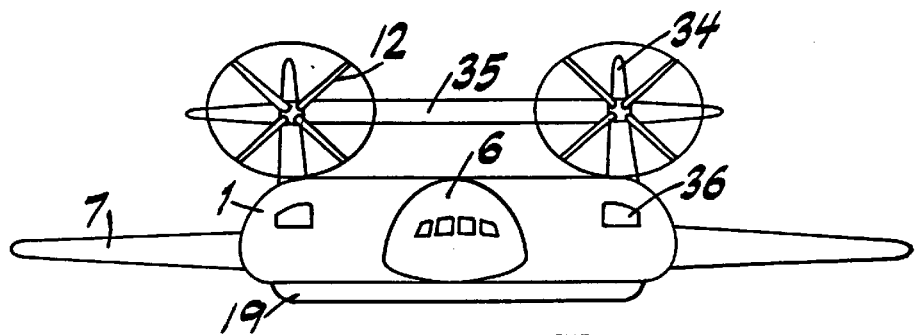
FIG. 5. Front view of the flying machine with propulsion propellers, disposed in front of the fins.
Figure 6:
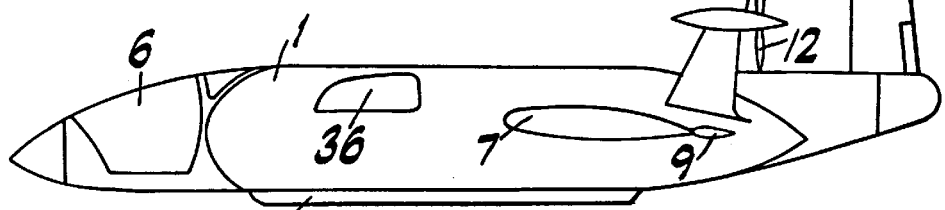
FIGS. 6 and 7. Side and front views of the flying machine with propulsion propellers disposed on pilons.
Figure 7:
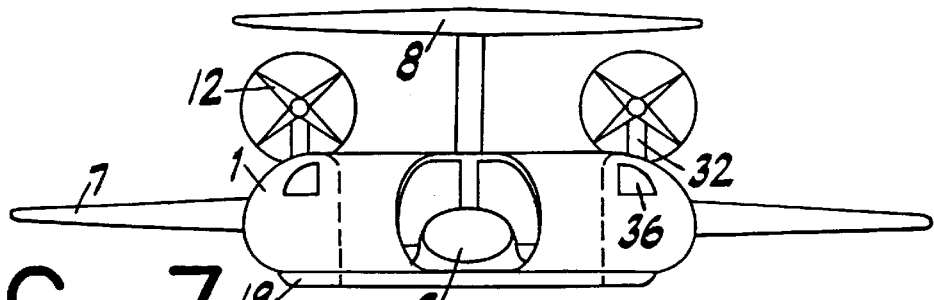

Said combined flying machine comprises a fuselage 1, manufactured in the form of a central wing a thick asymmetrical cross-section with a cambered in plan leading edge and a straightline trailing edge, smooth lateral outlines and a flattened bottom surface. The fuselage is provided with a vertical tunnel 2, having a rounded inlet edge. Said tunnel of an annular cross-section occupies the main area in plan in the central part of the fuselage. Inside said tunnel there is a streamlined central body 3 with a lifting rotor 4. Said central body is connected with the tunnel wall by radial pilons 5. The flying machine is equipped with a cabin 6 to house the crew, passengers and loads, outboard wings 7 and a tail unit 8. The aerodynamic surfaces of said flying machine—the outboard wings and the tail unit, are provided with deflectable control elements, for instance, with flaps 9 and 10 and rudders 11. For level flight the flying machine is furnished with two propulsion propellers 12. The lifting rotor 4 and the propulsion propellers 12 are driven in rotation by a power plant that includes two engine modules 13. The engine modules 13 are arranged in the fuselage 1 at opposite sides relative to the tunnel 2. Said engine modules are connected by shafts 14 with the lifting rotor and by shafts 15 with the propulsion propellers. Both engine modules are connected with the lifting rotor, whereas each of the propulsion propellers is connected with its own engine module. The shafts 14 are connected at one side to the reduction gear 16 of the lifting rotor, and at the other side to a controllable coupling 17 on the engine modules. Said controllable couplings 17 may be of any of the following types: hydraulic, mechanical, electromagnetic, The shaft 15 is connected with the engine module by means of a controllable coupling 18, preferably with an adjustable gearing ratio. Said couplings 18 may be of any type. The flying machine is equipped with a landing device on an air cushion 19, surrounding the outlet of the vertical, tunnel. The area of the tunnel cross-section in the plane of the lifting rotor rotation amounts to 0.3 to 0.8 of the area of the air cushion of the landing device 19., Specifically, in a flying machine with a capacity of 18 people the area of the landing device air cushion amounts to 58 sq. m, while the area of the vertical tunnel cross-section is 38 sq. m in the plane of the lifting rotor rotation. The inlet opening of the tunnel is formed by a toroidal surface 20, smoothly merging with the upper surface of the central wing. As a result, in the middle part of the central wing there are thick aerodynamic profiles, which are streamlined similar to an annular wing, which improves the aerodynamic characteristics of the flying machine in level flight.

The flying machine is provided with a system to change the pitch of the rotor blades of the lifting rotor in common and individually. The blades 21 of the lifting rotor are hinged to the central cross-piece 22, secured to the output shaft 23 of the reduction gear 16. The main unit in the system of changing the common and cyclic step of the lifting rotor is a swashplate, comprising a rotating ring 24, non-rotating ring 25, torque-arms 26 and a cardanic suspension 27. The rotating ring 24 is connected by means of carriers 28 with the blades 21 of the lifting rotor. The non-rotating ring and the cardanic suspension 27 are connected by pull rods 29 with the levers 30, 31, respectively controlling the common pitch of the lifting rotor and the cyclic or individual pitch of the rotor blades of the lifting rotor.

The propulsion propellers are mounted above the upper surface of the central wing stern part beyond the line of the maximum thickness profile of the central wing stern part, coinciding with the inlet edge of the toroidal tunnel inlet opening. The specific zone of the propulsion propellers arrangement is determined by wind tunnel tests. In particular, the propulsion propellers are disposed with a misalignment towards the trailing edge of the central wing. Depending on the overall dimensions and the load-carrying capacity of the flying machine, the propulsion propellers are disposed either on pilons 32, or on the tail unit. The pylons 32 are arranged from two sides relative to the tunnel 2.

A flying machine with propulsion propellers on the tail unit are provided with two longitudinal beams 33, projecting above the upper surface of the stern part of the middle wing, two fins 34 and a horizontal stabilizer 35 that connects the fins. The propulsion propellers are mounted in front of the fins 34.

Air intakes 36 of the power plant are disposed on the upper surface of the central wing.

During take-off, the blades 21 of the lifting rotor 4 are set to the position of the minimum pitch and the power plant is started with the shafts 15 of the propulsion propellers 12 drive disengaged. The lifting rotor 4 is rotated and air is forced into the cavity of the landing device on the air cushion 19. Using the common pitch control lever 30, lift pressure is increased until the flying machine lifts off from the takeoff site. Afterwards the common pitch of the lifting rotor is increased and the flying machine is transferred into a hover condition. The flying machine is controlled in the hover condition by means of the lever 31 controlling the cyclic pitch of the lifting rotor and the swashplate of the system changing the common and cyclic pitch of the rotor. With a further increase of the common to pitch the lift force of the lifting rotor 4 becomes equal to or greater than the weight of the flying machine, and the latter is transferred into a condition of suspension in the air by lifting rotor 4. For acceleration of the flying machine the coupling 18 is engaged and the propulsion propellers start rotating. The thrust, developed by the propulsion propellers builds up gradually and at the initial stage of acceleration there is no need of considerable expenditure of power to drive the propulsion propellers. Since the central wing has an asymmetrical cross-section, a lift force is developed during a displacement from the zero angle of attack. An additional lift force is induced by the outboard wings, which are set at the optimum angle of attack. With an increase of the speed of flight, the aerodynamic lift force increases and, concurrently, the lift force, at the rotor 4 is reduced by a change in its common pitch. The saved power of the power plant is transferred to the propulsion propellers 12. On obtaining an aerodynamic lift force value equal to the weight of the flying machine, the lifting rotor 4 is disegaged from the power plant and the flying machine proceeds to as on airplane. The transition to flight as an airplane does not require the closing of the inlet opening of the tunnel, and therefore the disengagement of the lifting rotor 4 does not cause a change in the aerodynamic drag of the flying machine, which makes the control of the flying machine simpler and increases its reliability. The flying machine is kept in the air due to a lift, induced by the total aerodynamic surfaces the central wing of the outboard wings, which improves the aerodynamic coefficient of the machine. Said flying machine has no air intake device of the tunnel that projects into the incoming flow of air, which reduces its aerodynamic drag and improves the aerodynamic efficiency of the flying machine. When flying at a rated speed, the lifting rotor does not operate and air freely flows through the tunnel 2, flowing past the leading edge and trailing edge parts of the wing under conditions similar to the flow over the flat annular wing.

During landing the horizontal speed of flight is reduced and with a drop of the aerodynamic lift force down to a value less than the weight of the flying machine, the coupling 17 is engaged and the lifting rotor 4 is rotated at a minimum common pitch. The power plant has an excess of power and the rotated up of the lifting rotor will not cause a decrease in the horizontal thrust of the propulsion propellers 12. The rotated up of the lifting rotor also will not cause a substantial change in the aerodynamic drag of the flying machine, since there is no necessity to open the inlet opening of the tunnel. With a decrease of the horizontal speed of flight, more power is transferred to the lifting rotor, and the flying machine is placed into the hover regime due to the lifting force of the rotor 4. Then a vertical landing of the flying machine is carried out at a selected site. If required, the flying machine hovers over the ground surface or over water and is moved towards the place of landing, or in the flight regime over the ground, or on the air cushion.

Taking into consideration the fact that the power required for hovering of the flying machine over the ground screen amounts to less than the total power of the power plant, said flying machine can, if required, make a landing using one engine module 13. This being the case, the flying machine descends to an altitude at which it transfers from horizontal flight as an airplane to a hover regime over the ground screen. Using a similar procedure it is possible for the flying machine to take in aft.

Industrial Applicability

The possibility to realize said flying machine according to the invention is confirmed by the trial of a model sample of the applied flying machine. A full-scale flying machine may be manufactured, using modern technology and materials of the aviation industry.

What is claimed is:

1. A flying machine, comprising:

a fuselage having an aerodynamic cross-sectional shape in the form of a thick, central wing having a convex, upper surface and a flattened lower surface, said fuselage having a vertical tunnel extending therethrough with open inlet and outlet openings respectively at said upper and lower surfaces, a lifting rotor mounted in said tunnel for rotation about a vertical axis, said lifting rotor being confined between said upper and lower surfaces of said fuselage, said lifting rotor including rotor blades disposed in said tunnel, outboard wings extending laterally from said fuselage, two propulsion propellers supported from said fuselage for propelling the flying machine in level flight, a landing device including an air cushion at said lower surface of the fuselage surrounding said outlet opening, means for varying pitch of the rotor blades in common and individually, said tunnel having a cross-sectional area in a plane of rotation of the lifting rotor which is equal to 0.3 to 0.8 of the area of the air cushion of the landing device, said inlet opening of said tunnel being bounded by a smooth, toroidal surface which merges with the upper surface of said central wing, a power plant for driving said lifting rotor and said propulsion propellers, said power plant including two engine modules disposed on opposite sides of said tunnel, said lifting rotor being connected to both engine modules, each of said propulsion propellers being connected to a respective one of said engine modules, and means for mounting said propulsion propellers at a level above said upper surface of the fuselage at a stern portion of said fuselage rearwardly of a line of maximum thickness of the aerodynamic shape of the fuselage.

2. A flying machine as claimed in claim 1, wherein said means for mounting said propulsion propellers comprises two pylons connected to said fuselage on opposite sides of said tunnel, said propulsion propellers being mounted on said pylons.

3. A flying machine as claimed in claim 1, wherein said means for mounting said propulsion propellers comprises two longitudinal beams extending rearwardly from said fuselage at a level above the upper surface of the stern portion of said fuselage, said flying machine further comprising a tail assembly including two vertical tail fins mounted on said longitudinal beams and a horizontal stabilizer connected to said tail fins, said propulsion propellers being mounted in front of said tail fins, said tail fins being connected to said horizontal stabilizer inwardly of outward ends of the stabilizer.

4. A flying machine as claimed in claim 1, wherein said lifting rotor is secured at a fixed position within said tunnel between said upper and lower surfaces of said fuselage.

5. A flying machine as claimed in claim 1, wherein said wings have swept back leading edges and straight line trailing edges.

6. A flying machine as claimed in claim 1, wherein the tunnel is fixed in the fuselage and the fuselage is fixed with respect to the propulsion propellers, said propulsion propellers being rotatable about horizontal axes of rotation.

* * * * *